United States Patent [19]

Ender et al.

[11] 4,081,151
[45] Mar. 28, 1978

[54] STACKABLE WINDING CORES FOR MAGNETIC TAPES

[75] Inventors: Günter Ender, Munich; Helmut Schultz, Gauting; Hartmut Thiele, Munich; Leo Gruber, Pentenried; Heinrich Kober, Hohenschaeftlarn; Werner Böttcher, Munich; Tibor Macheiner, Oberschleissheim, all of Germany

[73] Assignee: AGFA-Gevaert, A.G., Leverkusen, Germany

[21] Appl. No.: 620,645

[22] Filed: Oct. 8, 1975

[30] Foreign Application Priority Data

Oct. 14, 1974 Germany ............................ 2448853

[51] Int. Cl.² ............................................. B65H 75/18
[52] U.S. Cl. .................................. 242/68.5; 206/394; 206/509
[58] Field of Search ................ 242/68.5, 71.8, 118.3, 242/118.31, 118.32, 118.41; 206/503, 509, 389, 391, 394

[56] References Cited

U.S. PATENT DOCUMENTS

| 3,153,519 | 10/1964 | Jewell et al. | 242/118.41 X |
| 3,482,684 | 12/1969 | Schladale | 242/68.5 X |
| 3,508,719 | 4/1970 | Browning | 242/71.8 |
| 3,527,344 | 9/1970 | Taus et al. | 206/503 X |
| 3,696,966 | 10/1972 | Herolzer | 206/509 |
| 3,848,310 | 11/1974 | Steinback | 242/68.5 X |

Primary Examiner—Harvey C. Hornsby
Assistant Examiner—John M. Jillions
Attorney, Agent, or Firm—Connolly and Hutz

[57] ABSTRACT

The winding cores are flangeless and adapted to receive magnetic tapes. For reasons of compact packaging, it is desired to be able to stack several reels of tape securely for transport. For this reason, the winding core is designed so that the height of the winding surface is equal to or slightly greater than the width of the tapes to be wound on it. In addition, the surfaces between the internal and external circumference or on the internal circumference of the winding core have projections which project upwards or downwards from the medial plane of the core by half the total height of the core. When several cores are stacked above one another, these projections interlock so that the winding surfaces are stacked as closely together as possible.

7 Claims, 5 Drawing Figures

STACKABLE WINDING CORES FOR MAGNETIC TAPES

This invention relates to flangeless winding cores for magnetic tapes, the cores each having an axial, cylindrical bore, being capable of holding tape reels of large diameter and being securely stackable above one another so that they can be safely transported and take up little space.

Recording tapes are manufactured from coated sheets by severing them into lengths of up to several thousand meters and a width of, for example 3.8 or 6.3 mm and winding them on winding cores. The tapes are supplied in this form to compact cassette manufacturers and recording studios where they are played and packaged according to their particular purpose. 3.81 mm and 6.3 mm tapes are wound on standard so-called NARTB cores. These are flangeless plastics rings which have a winding surface 8.9 mm wide because the holding devices of the processing machines used for these tapes are mainly adjusted to this width. In view of the difference between the width of the winding surface of the core and the width of the tape, it is necessary to insert rings of foam or cardboard between the stacked reels of tape for transport so that the individual reels, which may have a diameter of as much as 35 cm or even more, will not be deformed by the jarring and jolting to which they are liable to be subjected in transport.

The stack of reels must also be prevented from slipping out of place by inserting cardboard sleeves into the axial bores of the winding cores. This method of packing tapes is very bulky and expensive on account of the packaging material used. In view of these disadvantages, it was an object of the present invention to provide flangeless winding cores which could be stacked compactly for transport without requiring much expense on packaging material.

According to the invention, there is provided a stackable winding core for a magnetic tape, the core having an annular body defining an axial, cylindrical bore and a peripheral winding surface situated centrally with respect to the medial plane of the core, the surfaces between the internal and external circumference of the core or the internal circumference of the winding core being provided with deformations which project upwards or downwards from the plane of projection of the core by half the total width of the core and the deformations on the two sides of the winding core interlockable with each other when the cores are stacked so that the winding surfaces of adjacent cores are situated closely adjacent one another.

In one embodiment of the invention, the deformations on the winding core are in the form of clamping lugs situated directly on the internal circumference of the core and projecting alternately from opposite sides of the core. The core generally has three such clamping lugs on each side and each lug has a central semi-circular recess of the kind conventionally provided for receiving the driving pins of the tape recorders. The surfaces in the intervals between the clamping lugs on each side are recessed in the width of the lugs so that the cores can be stacked without spaces between them and are secured against rotation in the stack. In a second embodiment, the deformations are in the form of continuous upwardly and downwardly disposed radial rims, which like the deformations in the first embodiment, extend upwards and downwards by half the total width of the winding core. This formation results in elevations and depressions which extend over the whole circumference of the core. In both embodiments of the core, the height of the winding surface is at least 3.81 mm for compact cassette tapes, and for other tapes it is also at least equal to the width of the tape. The total width of the cylindrical winding core is 8.9 mm to conform to the currently accepted standard norm for magnetic tapes. The winding cores may in addition be reinforced by ribs in known manner. In the first embodiment, these ribs may be arranged on the lateral surfaces between the internal and external circumference of the core, parallel or perpendicularly to the winding surface. In the second embodiment of the winding core, the teeth or means for securing the core against rotation are in the form of individual conical recesses and corresponding pins of the same geometry on the outer surface and inner surface, respectively, of the annular beading formed by the continuous upwardly and downwardly disposed radial rims.

The invention will now be described in more detail with reference to embodiments shown in the accompanying drawings, in which.

Figure 1:
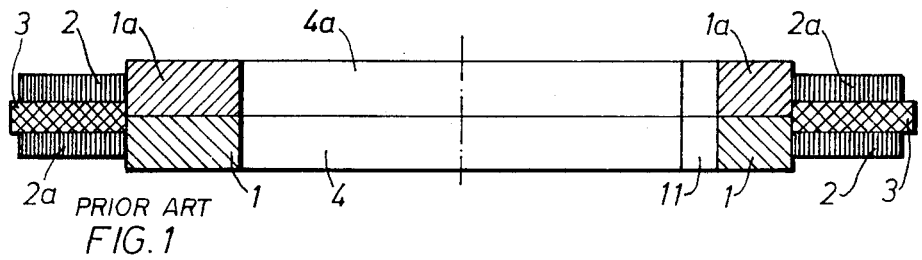
FIG. 1 represents a known winding core.

FIG. 1 shows two conventional winding cores 1 and 1a stacked together. It is obvious that since the core has the standard height of 8.9 mm, inserts 3, which maybe made either of foam or cardboard must be inserted in the spaces between reels of magnetic tape 2 and 2a on the winding cores, assuming the magnetic tapes narrower than the cores, so that the reels will not be deformed by the vibrations to which they may be subjected in transport as already mentioned above. In addition, cylindrical axial bores 4 and 4a in the stacked cores must be provided with rods or cardboard sleeves having a diameter equal to that of the axial bores to centre the stack.

Figure 2:
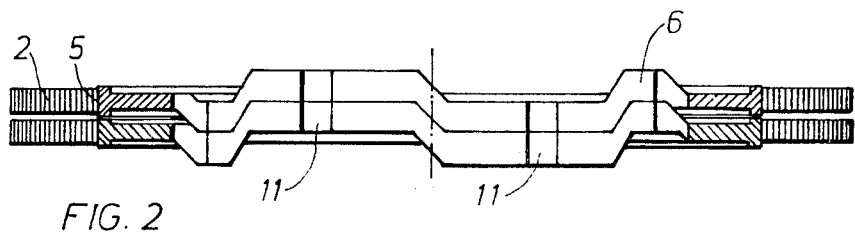
FIG. 2 shows a section through a winding core according to the invention.
Figure 3:
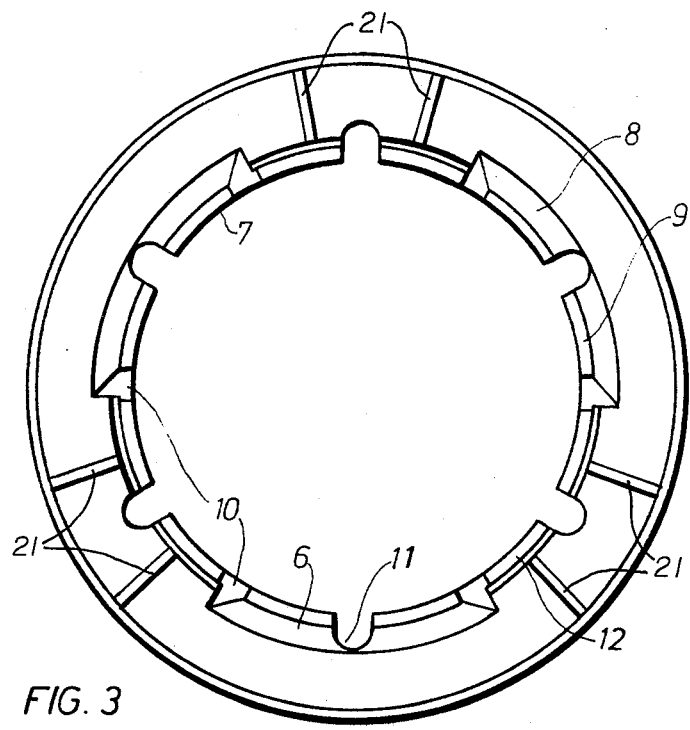
FIG. 3 is a top plan view of the winding core of FIG. 2.

The winding cores according to the invention shown in FIGS. 2 – 5 have, of course, the same internal and external diameters and total height prescribed by the standard norm but in order that they may be stacked more compactly, as shown in FIGS. 2 and 3, the height of the winding surface 5 is only equal to or not appreciably greater than the width of the tape which is to be wound on it (e.g. 3.81 mm). The winding surface is arranged centrally or symmetrically with respect to the medial plane of the core. On the internal circumference of the core, a plurality of clamping lugs 6 are arranged alternately on opposite sides of the core. In the present case, there are three such lugs on each side of the core, each having a length corresponding to a circular arc if 60° and being separated from the adjacent lugs by an arc of 60°. The internal surfaces 7 of the clamping lugs (see FIG. 3) extend normal to the plane of core and serve as supporting surfaces for the holding devices of the processing machines, e.g. the cutting machines, rewinders, copying instruments, etc. The outwardly facing surface 8 of the lugs is inclined at an angle of about 60° and the intermediate portion 9 of the lug is parallel to the plane of the core. The ends 10 of the lugs are uniformly chamfered. The clamping lugs also have half way along their length the usual recesses 11 in the form of elongate slots for receiving the driving pins of the holding devices. Recesses 12 extending between the lugs are shaped to receive the intermediate portions 9 of the lugs on the winding core above them. The recesses 12 are generally in the form of wide grooves. This ensures that the cores are stacked snugly above one another and prevents the cores from moving out of place in the stack. To save material, the body of the winding core may be thinner than the height of the winding surface between the external circumference and clamping lugs. To ensure that the core will then still be rigid, it may be advisable to provide these surfaces with reinforcing ribs known per se. There may be three or more such ribs 21 and the distances between them are generally equal. These ribs may be of any form and in the simplest case they are truncated pyramids of rectangular cross-section. They may be arranged parallel or perpendicularly to the winding surface. The winding cores according to the invention as described above enable a large number or reels of tape to be stacked securely and within a small space in a way which has never been achieved before and without the aid of inserts, cardboard sleeves or the like to fix the cores in position.

All these measures also substantially reduced the quantity of packaging material, which is not least an advantage to the consumers who previously had to destroy the additional packaging material. The winding cores are manufactured as before of synthetic resins or metal alloys and are cast or injection-moulded according to the material used.

Figure 4:
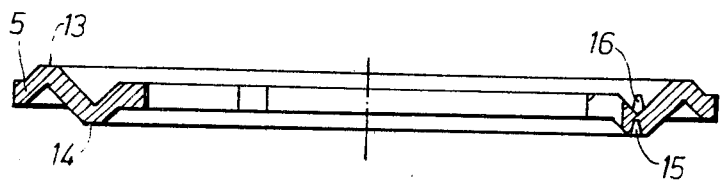
FIG. 4 is a section through a winding core according to the invention in which an annular beading is formed on each side of the core by continuous upwardly and downwardly disposed radial rims of the body of the core.
Figure 5:
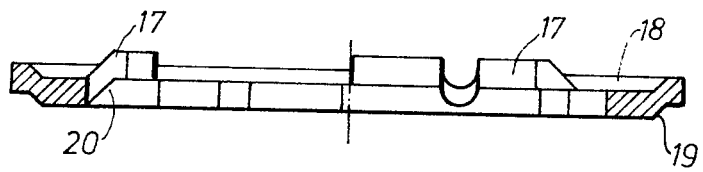
FIG. 5 is a section through a winding core according to the invention in which the two lateral surfaces of the core have different deformations.

In another embodiment of the invention, the deformations of the core are in the form of continuous upwardly and downwardly disposed radial rims in the area between the cylindrical bore and winding surface of the core as shown in FIG. 4 instead of being in the form of clamping lugs. The width of the winding surface is in that case again about equal to the width of the tape which is to be wound on it and the winding surface itself is arranged centrally to the medial plane of the core. Viewed from the winding surface 5, the continuously downwardly disposed stacking means are formed by a radial rim 14 and upward rim 13 between the cylindrical bore and the winding surface so that the cores can be fitted into each other when stacked. These stacking means are also symmetrical in relation to the medial plane of the body of core. To secure the cores against rotation within the stack, individual conical recesses 15 and mating pins 16 may be provided on the outer and inner side of the annular beadings formed by the deformations. In this embodiment, as in the previously described embodiment, the reels are stacked without space between them.

The advantages mentioned for the first embodiment with regard to the reduced amount of material used and elimination of packaging material are equally applicable to the above-mentioned core.

As a variation of the embodiments described above, the deformations of the core need not be the same on both sides but may be different. In that case (FIG. 5), one side of the core is provided with clamping lugs 17 as in the first embodiment and the body of the core between the clamping lugs and external circumference is recessed 18 to the same depth below the top of the winding surface as the other side 19 of the core is elevated. The surface 20 between two adjacent clamping lugs is chamfered at an angle of about 60°. Each such core can only be stacked one way up, that is to say the elevated side of one core of the stack must always be placed into the recessed surface 18 of the other.

What we claim is:

1. A stackable winding core for a magnetic tape, the core having an annular body defining an axial, cylindrical bore and a peripheral winding surface situated centrally with respect to the medial plane of the core, the annular body having horizontal surfaces between the cylindrical bore and the winding surface, the annular body being provided with deformations which project from a medial plane of the core alternately upwardly and downwardly by about the width of the annular body and protrude beyond the horizontal surface of the annular body by about half the width of the annular body and the deformations on both sides of the winding core being interlockable with each other when the cores are stacked so that the peripheral winding surfaces of adjacent cores are situated closely adjacent one another.

2. A winding core according to claim 1, wherein the deformations form a plurality of lugs in the area adjacent to the cylindrical bore, which project alternately on both sides of the core, and the surfaces between the elevated lugs correspond to the medial plane of the core, so that the lugs are interlockable with each other when the cores are stacked.

3. A winding core according to claim 2, wherein at least three lugs are arranged on each side of the core.

4. A winding core according to claim 3, wherein the lugs have semicircular recesses adapted to receive driving pins of a processing machine on which the core is to be received.

5. A winding core according to claim 3, wherein the area of the lugs facing the winding surface is chamfered at an angle of 60°.

6. A winding core according to claim 2, wherein the horizontal surfaces of the annular body of the core are provided with reinforcing ribs arranged parallel or perpendicular to the winding surface.

7. A winding core according to claim 1 with a magnetic tape wound thereon which has a width equal to or not substantially less than the width of the winding surface.

* * * * *

REEXAMINATION CERTIFICATE (972nd)
United States Patent [19]
Ender et al.

[11] B1 4,081,151

[45] Certificate Issued  Dec. 27, 1988

[54] STACKABLE WINDING CORES FOR MAGNETIC TAPES

[75] Inventors: Günter Ender, Munich; Helmut Schultz, Gauting; Hartmut Thiele, Munich; Leo Gruber, Pentenried; Heinrich Kober, Hohenschaeftlarn; Werner Böttcher, Munich; Tibor Macheiner, Oberschleissheim, all of Fed. Rep. of Germany

[73] Assignee: AGFA-Gevaert, A.G., Leverkusen, Fed. Rep. of Germany

Reexamination Request:
No. 90/001,482, Mar. 29, 1988

Reexamination Certificate for:
Patent No.: 4,081,151
Issued: Mar. 28, 1978
Appl. No.: 620,645
Filed: Oct. 8, 1975

[30] Foreign Application Priority Data
Oct. 14, 1974 [DE] Fed. Rep. of Germany ....... 2448853

[51] Int. Cl.⁴ .............................................. B65H 75/18
[52] U.S. Cl. .................................. 242/68.5; 206/394; 206/509

[58] Field of Search ............. 242/68.5, 68, 71.8, 242/118.3, 118.31, 118.32, 118, 118.41, 159, 166, 176, 177, 178, 222; 206/389, 391, 392, 394, 403, 503, 509

[56] References Cited
U.S. PATENT DOCUMENTS

| | | | |
|---|---|---|---|
| 3,153,519 | 10/1964 | Jewell et al. | 242/118.41 X |
| 3,482,684 | 12/1969 | Schladale | 242/68.5 X |
| 3,508,719 | 4/1970 | Browning | 242/71.8 |
| 3,527,344 | 9/1970 | Taus et al. | 206/503 X |
| 3,696,966 | 10/1972 | Herolzer | 206/509 |
| 3,848,310 | 11/1974 | Steinbeck | 242/68.5 X |

FOREIGN PATENT DOCUMENTS
791182 of 1958 United Kingdom.

*Primary Examiner*—Stanley N. Gilreath

[57] ABSTRACT

The winding cores are flangeless and adapted to receive magnetic tapes. For reasons of compact packaging, it is desired to be able to stack several reels of tape securely for transport. For this reason, the winding core is designed so that the height of the winding surface is equal to or slightly greater than the width of the tapes to be wound on it. In addition, the surfaces between the internal and external circumference or on the internal circumference of the winding core have projections which project upwards or downwards from the medial plane of the core by half the total height of the core. When several cores are stacked above one another, these projections interlock so that the winding surfaces are stacked as closely together as possible.

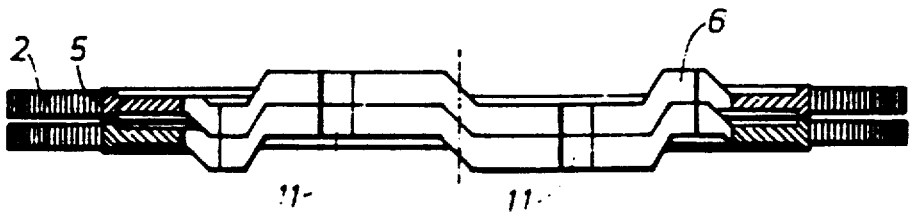

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1-7 is confirmed.

* * * * *